Dec. 10, 1946.  C. W. HALL  2,412,260
AIR COOLED ROTARY VALVE
Filed March 20, 1945
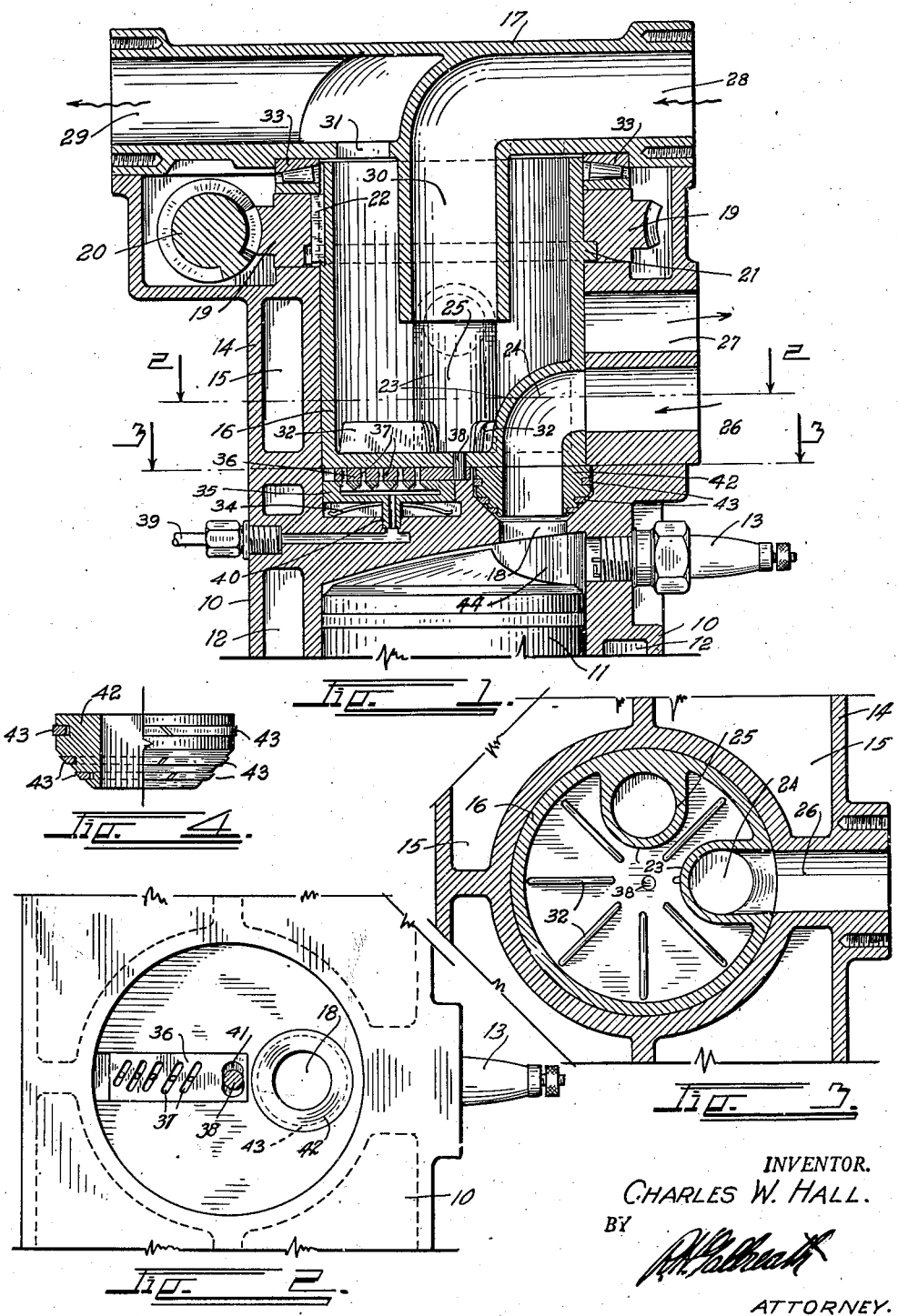
INVENTOR.
CHARLES W. HALL.
BY
ATTORNEY.

Patented Dec. 10, 1946

2,412,260

UNITED STATES PATENT OFFICE 2,412,260

AIR-COOLED ROTARY VALVE

Charles W. Hall, Denver, Colo., assignor to Malcolm S. Losey, Denver, Colo.

Application March 20, 1945, Serial No. 583,803

3 Claims. (Cl. 123—190)

This invention relates to a rotary valve for internal combustion engines and has for its principal object the provision of a valve of this character through which cooling air can be circulated for maintaining the valve at proper operating temperature.

Other objects of the invention are: to provide a highly efficient drive mechanism for a valve of this character; to provide efficient lubricating means for the face of the valve which will distribute lubricant uniformly over the face, which will not wear grooves in the face, and which will automatically close off the oil supply during the intake stroke of the engine to prevent oil from being drawn from the supply by vacuum.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a vertical section through the head of a typical internal combustion engine cylinder illustrating the improved valve in place thereon;

Figs. 2 and 3 are horizontal cross-sections through the valve, taken on the lines 2—2 and 3—3, Fig. 1, respectively; and Fig. 4 is a detail view of a sealing ring employed in the improved valve.

In prior rotary valves it has been found that the incoming gas becomes so super-heated in passing through the valve that it lowers the efficiency of the engine due to excess preliminary expansion. This invention is designed to obviate this objection by providing means for cooling the valve and for shortening the path of the incoming gas through the valve. This is accomplished by avoiding all masses of material in the valve itself, and by providing means for constantly circulating cooling air throughout the entire interior of the valve.

One means for accomplishing this is illustrated in the drawing in which a cylinder block is indicated at 10, with its piston at 11, water jacket at 12, and spark plug at 13. A valve head 14 is mounted on the cylinder block 10, and this may also be provided with water jacket space 15, if desired. The head 14 is formed with cylindrical valve receiving seats in each of which a rotary valve 16 is mounted, there being one valve for each cylinder. The valve seats pass entirely through the heads 14 and are closed at their tops by means of an air manifold 17. A cylinder port 18 communicates between each of the cylinders of the cylinder block 10 and its valve seats in the head 14.

The valve 16 is cup-shaped—that is, it has an open top and a closed bottom and may be rotated in any desired manner. As illustrated, it is provided with a ring worm gear 19 which is driven from a worm 20. The gear 19 rests against a shoulder 21 on the valve 16 and is keyed to the latter as shown at 22.

The valve 16 contains two curved passage tubes, an intake tube 24, and an exhaust tube 25, which communicate through eccentrically positioned openings in the bottom of the valve 16 positioned to alternately align with the cylinder port 18 as the valve rotates. Both tubes exit through the side wall of the valve, the tube 24 being in alignment with an intake port 26, and the tube 25 being in alignment with an exhaust port 27. The valve 16 is so timed that the tube 24 will connect the port 26 to the cylinder port 18 during the intake stroke of the piston 11, and the tube 25 will connect the port 27 with the cylinder port 18 during the exhaust stroke of the piston 11.

An air intake passage 28 and an air discharge passage 29 are formed in the air manifold 17. The intake passage communicates with a downwardly extending nozzle 30 axially positioned within the valve 16. The outlet passage 29 communicates through air openings 31 with the hollow interior of the valve 16 around the nozzle 30.

During the operation of the engine a constant supply of cool air is forced into the passage 28 and blown against the bottom of the valve from the nozzle 30, rising from along the walls thereof to cool the latter, and thence discharging through the passage 29. This provides an efficient cooling system for the valves at all times during the operation of the motor. It is preferred to form cooling fins 32 on the bottom of the valve to assist in the heat transfer.

The valve is constantly urged upwardly against a thrust bearing 33 by means of a leaf spring 34. The spring acts against a plunger 35, which in turn acts against an oscillating oil-distributing bar 36 to force the latter against the bottom of the valve. The bar 36 is provided with a series of oil slots 37 which intermittently align with oil holes in the plunger 35.

The bar 36 is oscillated by means of an eccentric pin 38 in the bottom of the valve 16. This pin is positioned eccentrically of the axis of the valve and extends into a receiving slot 41 in the bar 36 so that during the intake stroke of the motor the oil holes 37 will be drawn out of alignment with the oil holes in the plunger 35 to prevent sucking in of lubricating oil. During the remainder of the rotation of the valve, the oil holes will be in alignment to supply lubrication to the bottom of the valve. The oscillation of the bar 36 prevents wearing circular grooves in the bottom of the valve, and uniformly distributes the lubricating oil over the surface thereof. The oil is supplied from an oil pressure line 39 through a stem 40 on the plunger 35.

The cylinder port 18 is provided with a sealing ring of a design which will not only seal the port 18 to the valve and to the cylinder block 10, but will also exert an upward push on the valve 16. This ring comprises an annular, truncated, conical ring member 42 fitting a recess in the block 10 conforming to the contour of the ring member 42. The ring member 42 is provided with a plurality of radially expansible sealing rings 43, both in its cylindrical and in its conical surfaces. The expansion of rings in the conical surface tends to force the ring member 42 upwardly into snug, gas-tight engagement with the bottom of the valve. The purpose of the combination of a cylindrical surface and a conical surface on the ring resides in the fact that the cylindrical surface will always maintain the ring in accurate axial alignment with the cylinder port 18 while the conical surface imparts its upward thrust to the ring.

It is desired to call attention to the unusual shape of the head of the piston 11 and the head of its cylinder. The head of the piston is dome-shaped with a pocket 44 formed therein. The pocket is positioned at one side of the head beneath the cylinder port 18 and opposite the spark plug 13. The remainder of the dome-shaped head fits closely to the head of the cylinder when the piston is in its uppermost position.

This forces the gas into a small chamber formed by the pocket 44 and the port 18 where it is subjected to great turbulence resulting in perfect mixture of the gas and air. This perfect mixture is forced into intimate contact with the ignition spark so that highly efficient combustion is attained.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A rotary valve for an internal combustion engine comprising: a hollow cylindrical valve positioned and arranged to control the intake and exhaust gases to a cylinder of said engine; an air intake passage discharging into the hollow interior of said valve; an air discharge passage communicating with said hollow interior to carry the air therefrom; and a discharge nozzle on said intake passage extending axially into said valve to direct the air toward the bottom thereof.

2. A rotary valve for an internal combustion engine comprising: a hollow cup-shaped rotary valve; passages positioned in said valve to alternately communicate with a cylinder of said engine; an air intake passage extending axially into the open top of said valve and discharging within the interior thereof; and an air outlet passage communicating with said hollow interior.

3. A rotary valve for an internal combustion engine comprising: a hollow cylindrical valve positioned and arranged to control the intake and exhaust gases to a cylinder of said engine; an oil-distributing bar resting against the bottom of said valve; a stud projecting eccentrically from said valve into said bar to impart a reciprocatory motion to said bar, there being oil-distributing passages through said bar; a plunger resting against said bar and having oil holes registering with the first distributing passages; spring means for urging said plunger against said bar to maintain the latter against the bottom of said valve; and means for supplying oil to the oil holes in said plunger.

CHARLES W. HALL.